United States Patent [19]

Prickett

[11] 4,231,654
[45] Nov. 4, 1980

[54] CONTROLLER FOR PHOTOGRAPHIC ENLARGER OR THE LIKE

[75] Inventor: William H. Prickett, Redwood City, Calif.

[73] Assignee: Michael E. Gorski, Menlo Park, Calif.

[21] Appl. No.: 34,071

[22] Filed: Apr. 27, 1979

[51] Int. Cl.³ .............................................. G03B 27/73
[52] U.S. Cl. ......................................... 355/38; 355/88
[58] Field of Search ................................... 355/35–38, 355/83, 88, 77

[56] References Cited

U.S. PATENT DOCUMENTS

| Re. 28,771 | 4/1976 | Aimi et al. | 355/38 X |
|---|---|---|---|
| 3,724,954 | 4/1973 | Dreyfoor, Jr. | 355/38 X |
| 3,873,199 | 3/1975 | Weinert | 355/38 |
| 3,873,200 | 3/1975 | Crete et al. | 355/38 |

Primary Examiner—L. T. Hix
Assistant Examiner—W. J. Brady
Attorney, Agent, or Firm—John L. McGannon

[57] ABSTRACT

A controller for providing accurate analysis of color and density of the light from any color enlarger or the like. The controller is an on-easel analyzer having built-in automatic timer controls for controlling exposures from point 1 seconds to 99.9 seconds. Density and color filtration data provided by video or other off-easel analyzers are manually entered into digital switches on a control panel of the controller or such data can be automatically programmed in the controller through the use of punched paper tape or the like. The controller includes null indicator means to indicate a balance when the enlarger f/stop and color balance are adjusted. The controller may be programmed in units as small as 1 cc in color filtration ranges from 0 to 99 cc and density ranged from 0 to 199 cc. Controller also has a photo-sensitive probe, slope controls, a digital emulsion memory system and the controller can operate with substantially any color enlarger.

10 Claims, 12 Drawing Figures

| FIG. 3A | FIG. 3B | FIG. 3C | FIG. 3D |
|---|---|---|---|
| FIG. 3E | FIG. 3F | FIG. 3G | FIG. 3H |

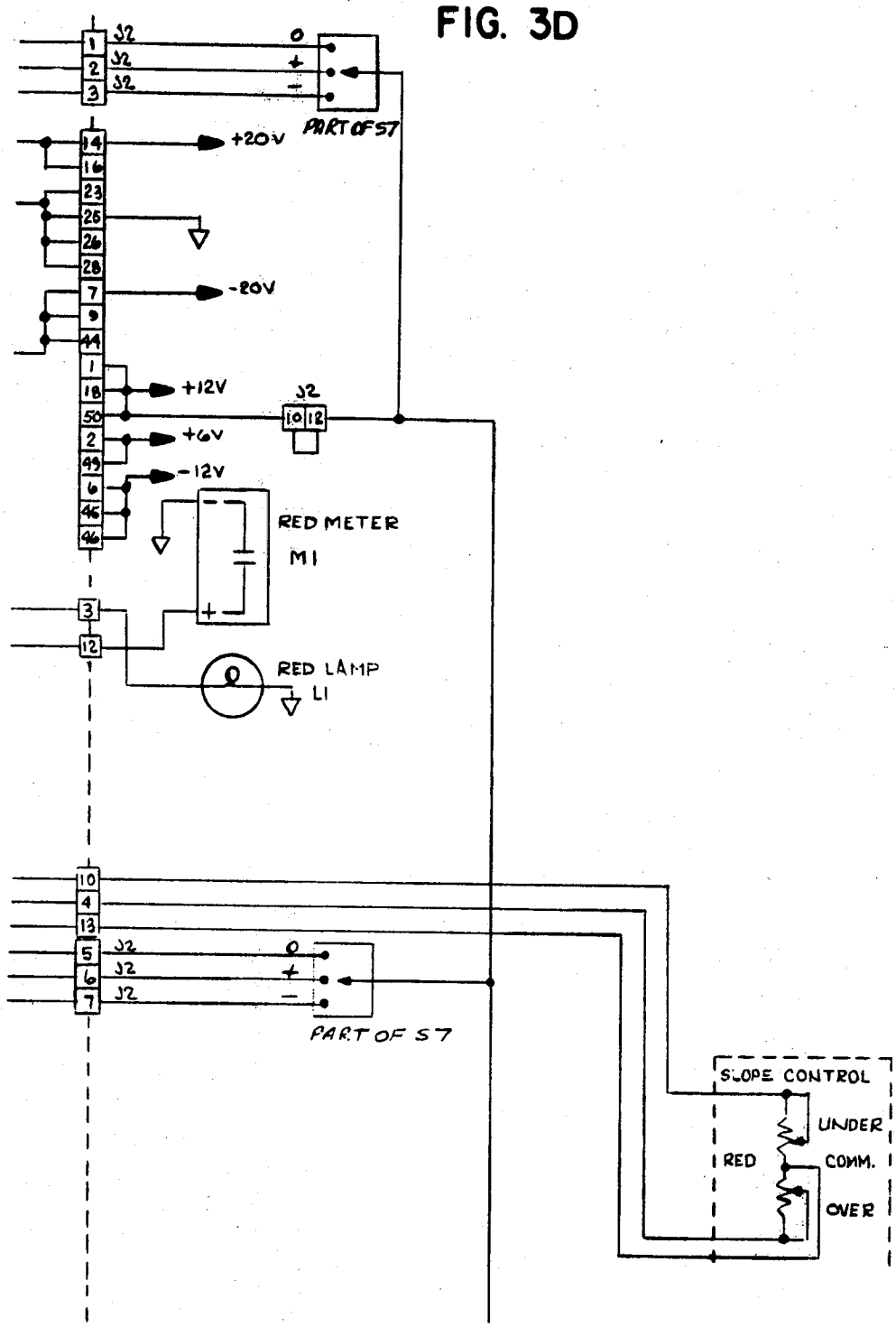

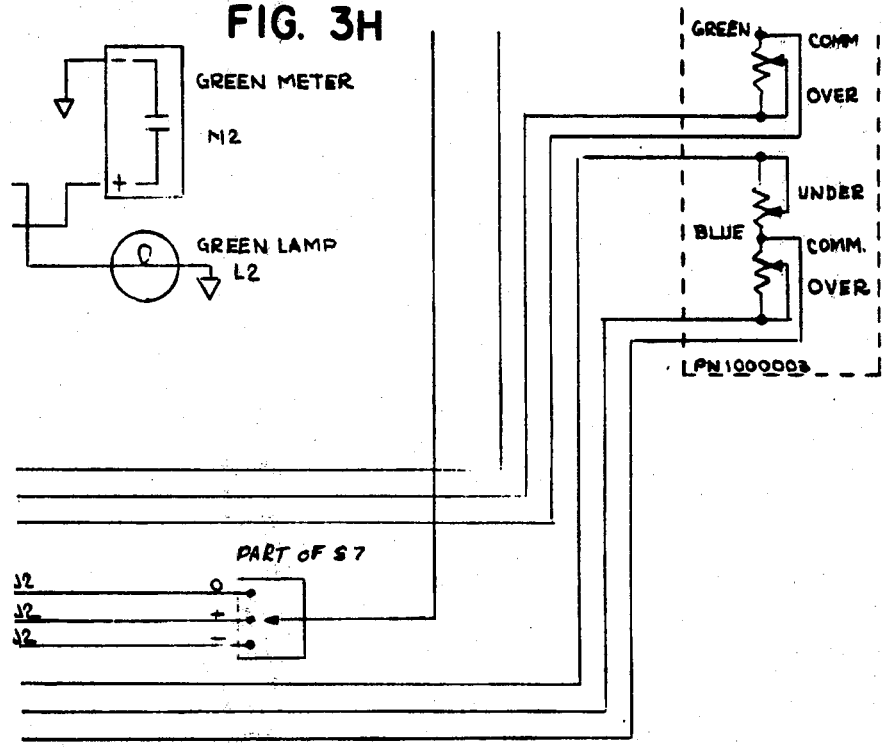
FIG. 3H
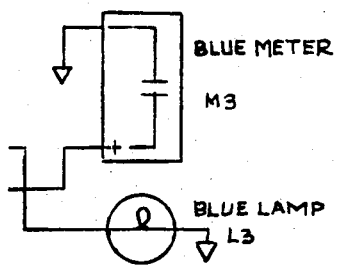

CONTROLLER FOR PHOTOGRAPHIC ENLARGER OR THE LIKE

This invention relates to improvements in the controlling of color enlargers or the like and, more particularly, to an improved controller for balancing f/stop and color output from a color enlarger.

BACKGROUND OF THE INVENTION

The f/stop and color balance of a color enlarger must be properly established to get consistent results in processing color negatives to provide the proper color print. To achieve this, there must be accurate analysis of the color of the light issuing from a color enlarger and also the density of the negatives which are to be printed with the use of the enlarger. In the past, attempts have been made to provide a control for these various parameters; however, the attempts have not always been completely satisfactory and, because of this drawback, a need has arisen for an improved controller which provides the necessary analysis and the control of the actuation of a color enlarger plus to provide consistently good results over long periods of operation time.

SUMMARY OF THE INVENTION

The present invention satisfies the aforesaid need by providing an on-easel color translator which is adapted to be the printing companion to any color video analyzer or other off-easel analyzing system. It is also an on-easel analyzer itself. The controller provides highly accurate analysis of color and density from any color enlarger and the unit has a built-in automatic timer which controls the lamp of a color enlarger for accurate exposures from 0.1 seconds to 99.9 seconds. In the function as controller, the unit of the present invention uses density and color filtration data provided by video or other off-easel analyzers and such data are manually entered into certain digital switches on the controller or the data can be automatically programmed through the use of punched paper tape or other storage technique. The enlarger f/stop and color balance are adjusted until visual null indicator means carried by the controller reach a null condition, signifying a perfect balance between the color and density from the color enlarger.

When the unit of the present invention is used as an on-easel analyzer, the density and color filtration data used to make a master print is manually entered into digital switches on the controller. A probe associated with the controller is placed on a desired portion of a projected negative. The controller has means for computing and displaying the requirements to properly print the negative and the operator of the unit can adjust the color and f/stop of the enlarger until the null condition identified by the null indicating means of the controller has been actuated.

The controller of the present invention may be programmed in units as small as 1 cc in color filtration ranges from 0 to 99 cc and density ranges from 0 to 199 cc. The unit can be of solid state electronic construction to obtain high reliability and accuracy as well as drift-free operation. The probe can be coupled to the controller by a relatively long cable and the digital emulsion memory system and null indicating means of the controller provide an economical operating system for the highest possible color print yield.

A primary object of this invention is to provide an improved filter for use with a color enlarger or the like wherein the density and color filtration data provided by video or other off-easel analyzers can be readily entered into the controller and used to provide the necessary settings for the color enlarger to provide a high color print yield from the operation of the enlarger.

Other objects of this invention will become apparent as the following specification progresses, reference being had to the accompanying drawings for an illustration of the invention.

IN THE DRAWINGS

FIGS. 3a–3h are schematic diagrams forming parts of a main schematic showing the electronic circuitry of the controller of the present invention.

Figure 1A:
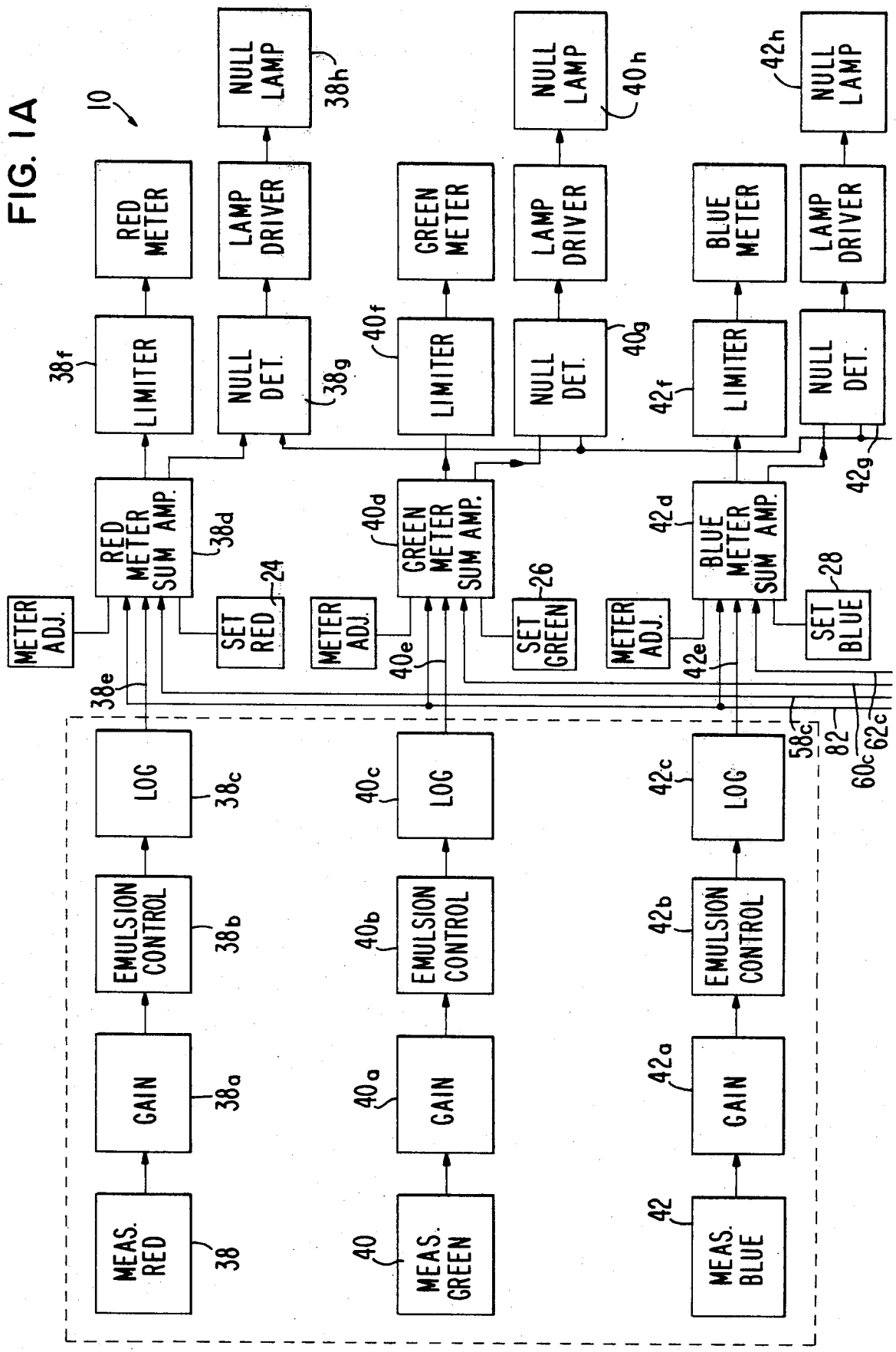
FIG. 1a is a first of two parts of a block diagram showing the controller of the present invention.
Figure 1B:
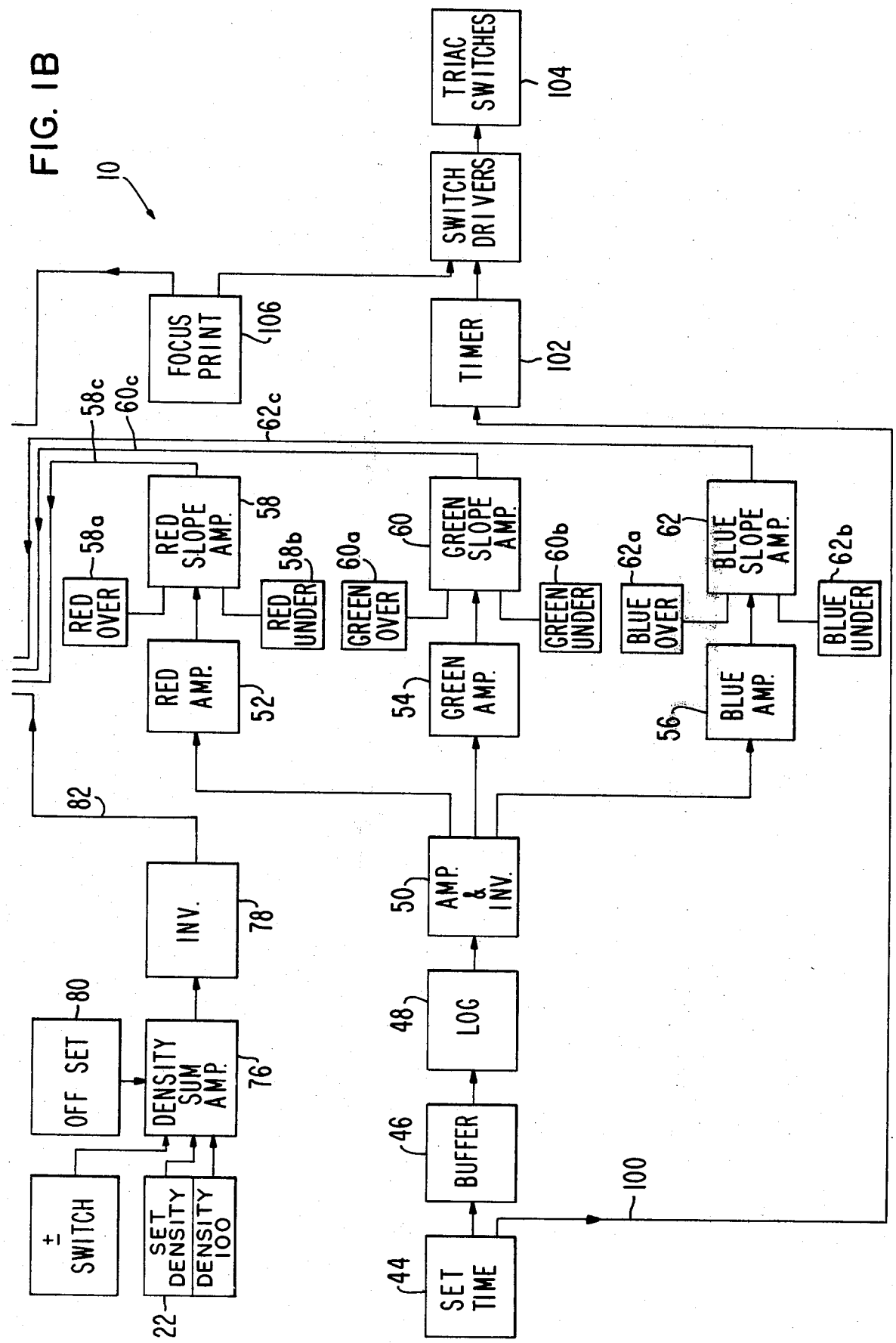
FIG. 1b is the second part of the block diagram showing the controller.

The controller of the present invention is broadly denoted by the numeral 10 and is illustrated in schematic form in FIGS. 3a–3h and in block form in FIGS. 1a and 1b. The controller is typically contained in a housing 12 (FIG. 2) provided with an inclined front panel 14 having a number of null meters 16, 18 and 20 and a number of density and color value input switches 22, 24, 26 and 28. A switch actuated by a push-button or expose bar 30 is carried by housing 12 on panel 14.

A probe 32 (FIG. 2) having a light receiving window 34 is coupled by a cable 36 to controller 10 in housing 12. Probe 32 is shown in FIG. 1a within the dashed line portion of the left-hand side of the figure. Probe 32 has three side-by-side photocells 38, 40 and 42 for reading red, green and blue light. The probe has a first set of filters (not shown in FIG. 1a), called wide band hot mirrors, which filter out unwanted infrared and ultraviolet light which is not useful in photographic measurements. A next set of filters (not shown) carried by the probe are the color separation filters used to separate the red, green and blue segments or wave lengths of light. In addition, the green and blue photocells have another infrared filter to further filter out the unwanted light. The filters are located between the photocells and window 34. Thus, photocell 38 for the red channel will receive only red light, photocell 40 for the green channel will receive only green light, and photocell 42 for the blue channel now will receive only blue light. Typically, the probe is placed in the path of light issuing from a photographic enlarger for determining the content of the red, green and blue segments of the light.

Probe 32 is stabilized with very low noise resistors and low leakage capacitors along with high precision amplifiers. The individual color channel voltage generated by each photo cell is applied to a precision preamplifier and a high gain amplifier which, for each photocell, is denoted by the numeral 38a, 40a, or 42a, depending upon which photocell is being referred to. The photocells and their amplifiers are in probe 32 and the amplifiers are coupled by cable 36 to emulsion controls 38b, 40b and 42b. Each emulsion control, with a plus-minus switch (not shown), is a series resistor used to control the input voltage range of the probe. Each resistor has a total of 300 steps for each of the three colors. This gives an effective range of eight stops (one to eight times the amount of light). With a single resistor change per color, this range may be increased to 16 or 32 stops.

The output voltage from each emulsion control resistor is applied to a precision logrithmic amplifier for which offsets and gain have been pre-established. The logrithmic amplifiers for the three photocells 38, 40 and 42 are denoted by the numerals 38c, 40c and 42c. The output from the logrithmic amplifiers 38c, 40c and 42c are fed to respective meter driven summation amplifiers 38d, 40d and 42d. Also, time offsets and density channel offsets are directed to the inputs of driver amplifiers 38d, 40d and 42d as hereinafter described.

The time offsets mentioned above are controlled by a time switch 44 (FIGS. 1b and 2) on control panel 14, the time switch being a series resistor with 1,000 steps (00.0 to 99.9 seconds). A voltage is taken from the timer switch 44 to ground into a buffer amplifier 46 (FIG. 1b) for time offset. This voltage is fed to a precision logrithmic amplifier 48 (FIG. 1b) for which offsets and gain have been preset. The output of amplifier 48 is directed to an operational amplifier 50 for inversion, then to three amplifiers 52, 54 and 56 representing red, green and blue, respectively, for gain and inversion and into respective slope amplifiers 58, 60 and 62 (FIG. 1b).

Figures 2, 4:
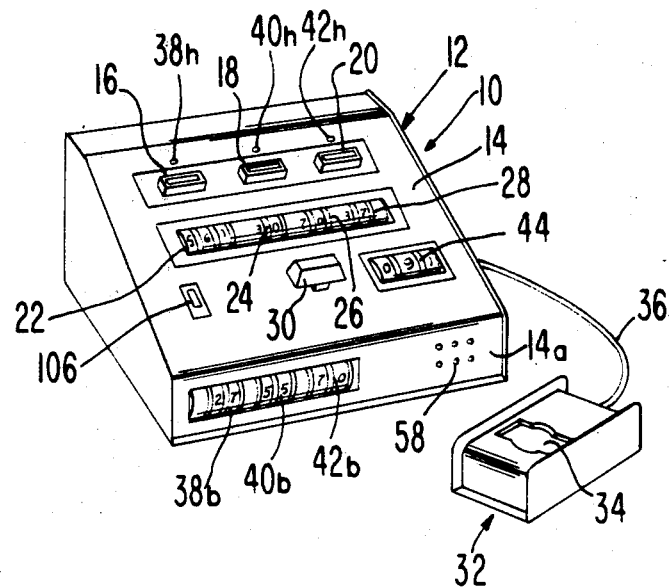
FIG. 2 is a perspective view of the controller in a housing and provided with a light sensitive probe coupled by a cable therewith.
FIG. 4 is a block diagram illustrating the way in which the drawings of FIGS. 3a–3h are related to each other.
Figure 3A:
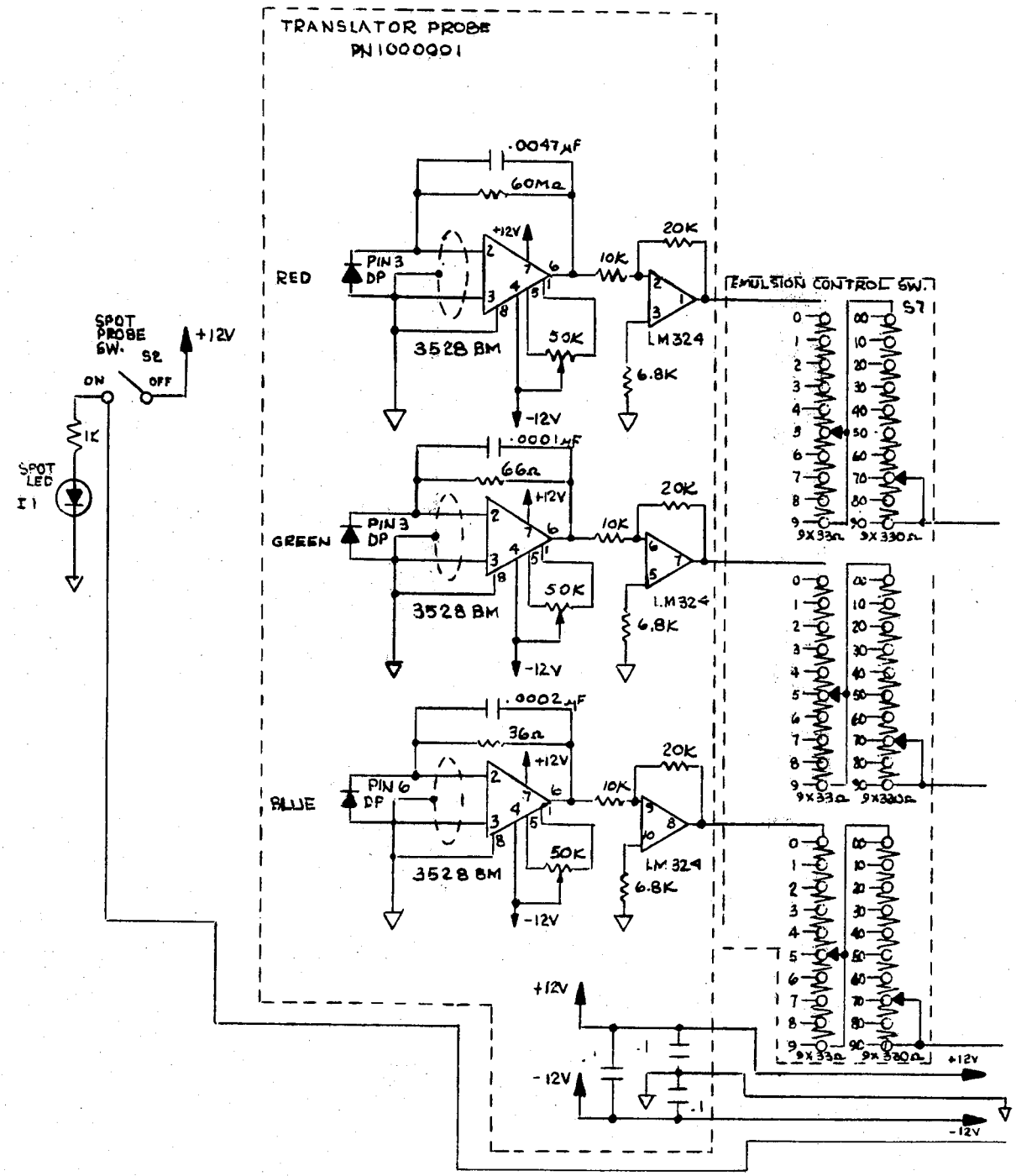
Figure 3B:
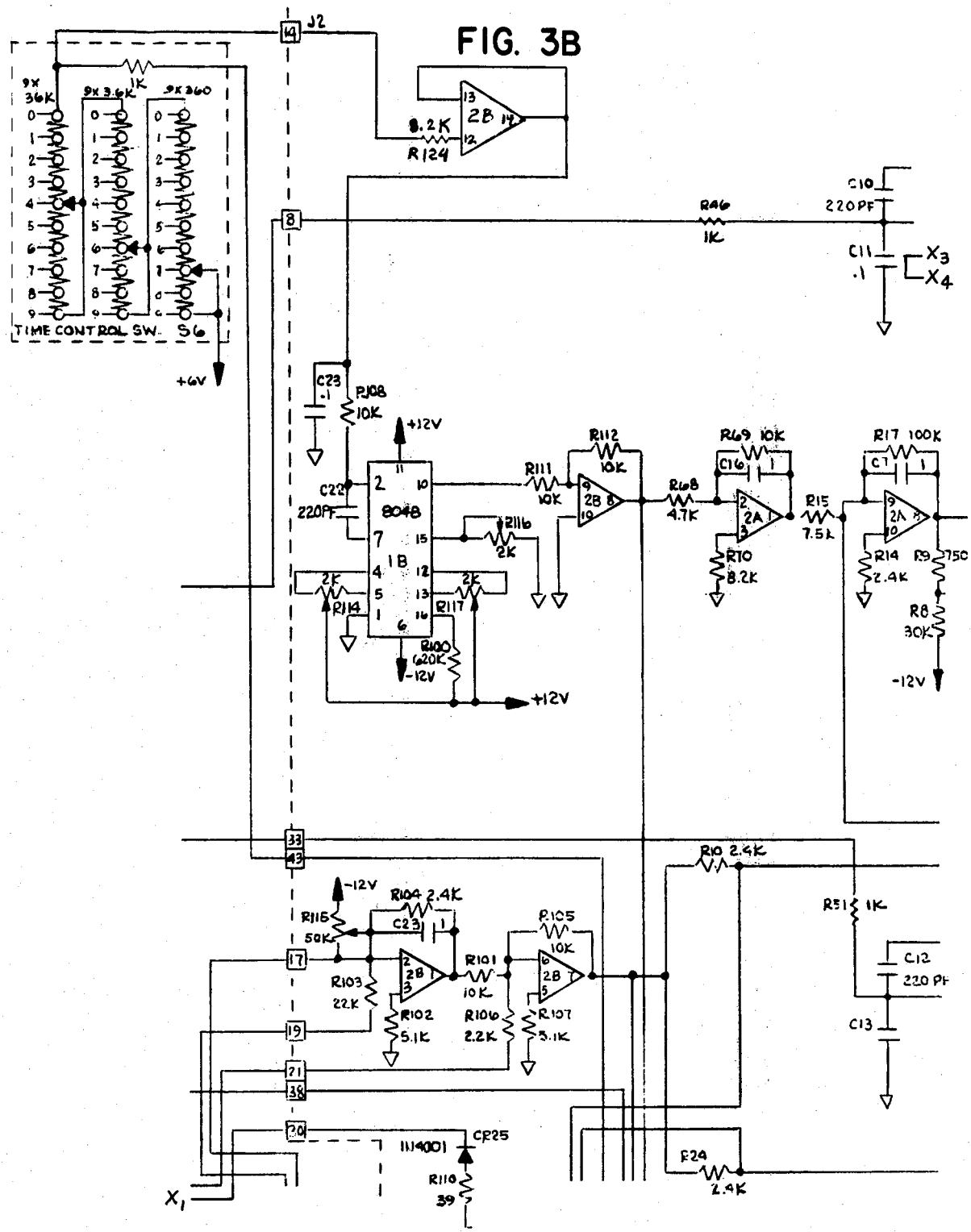
Figure 3C:
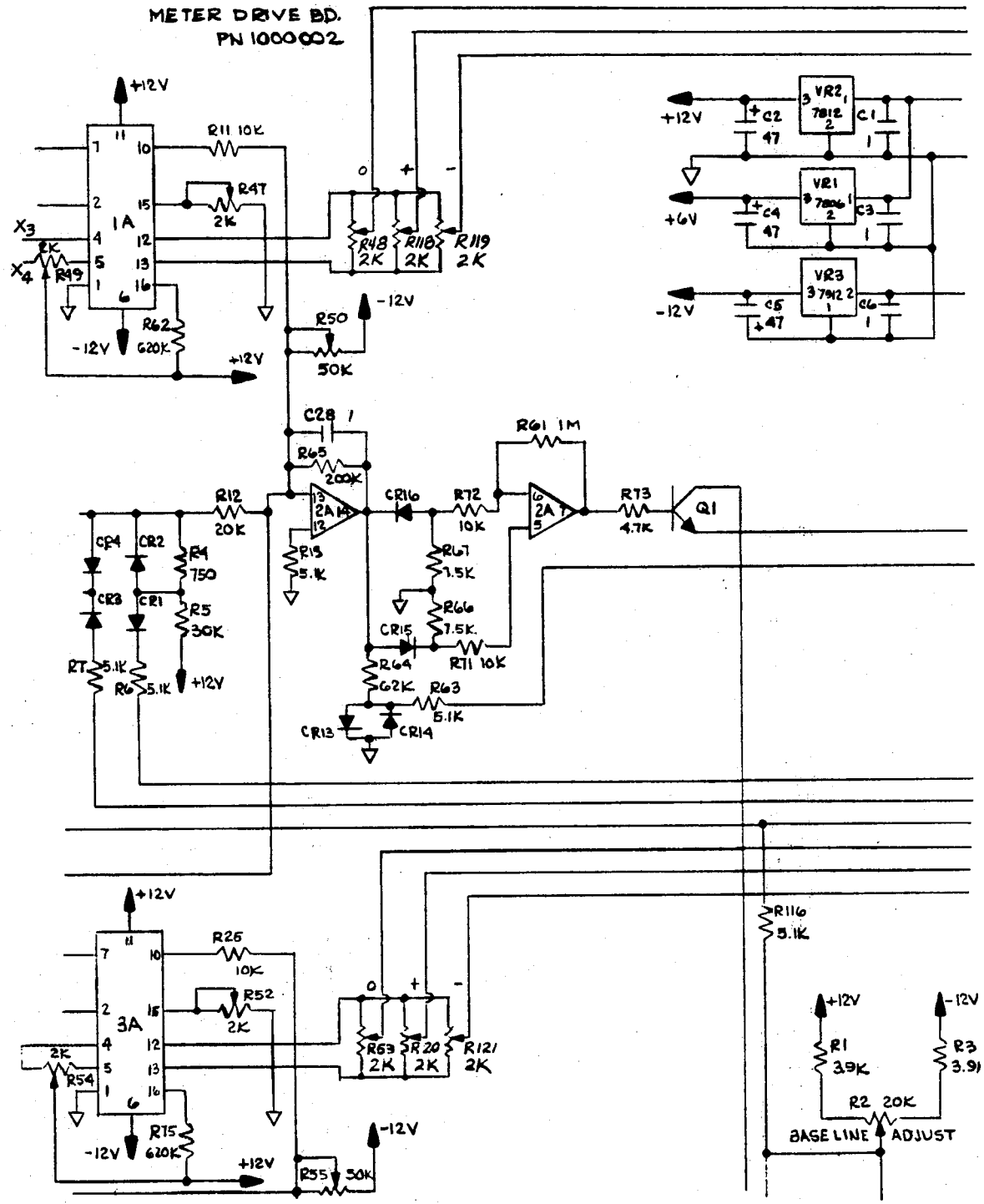
Figure 3E:
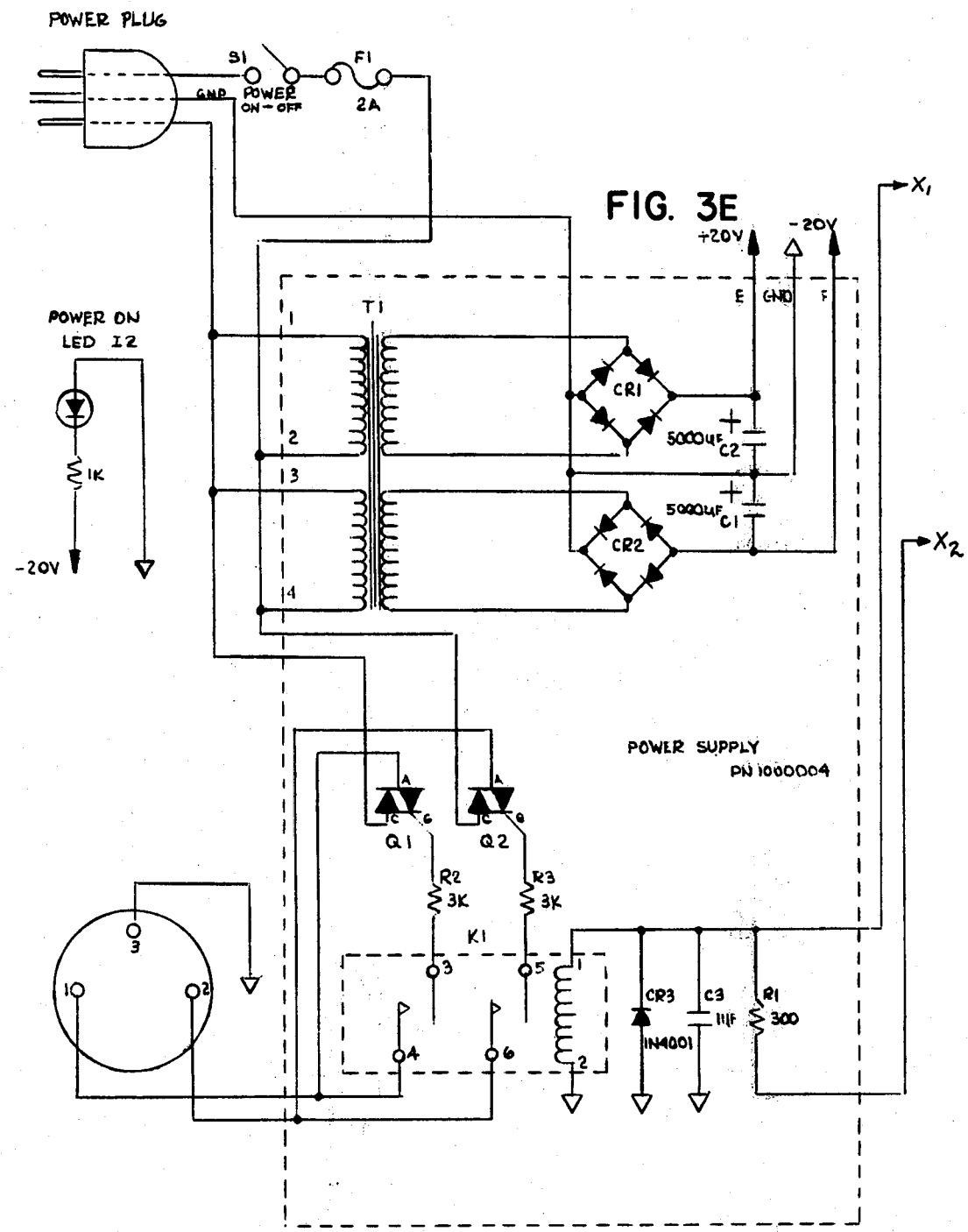
Figure 3F:
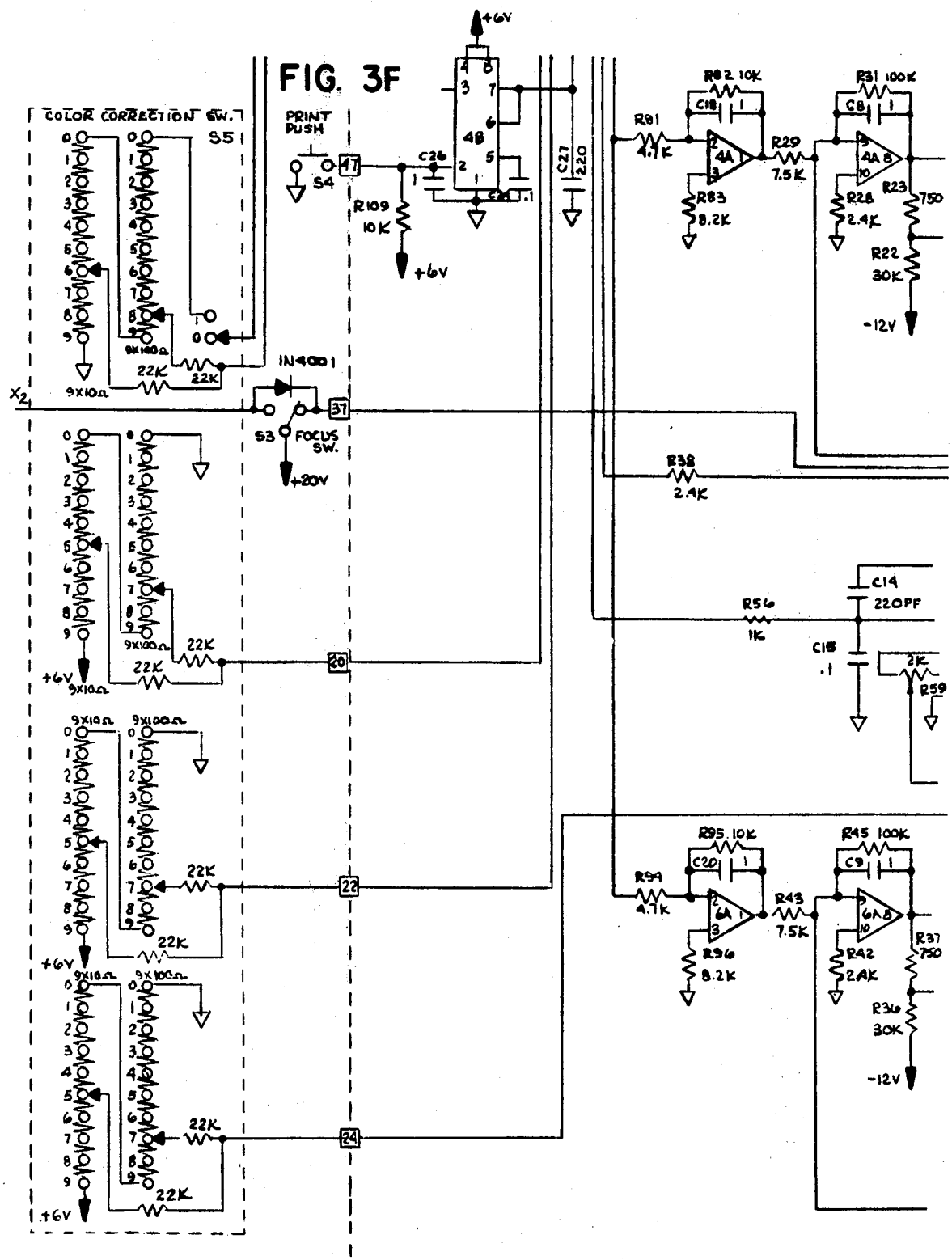
Figure 3G:
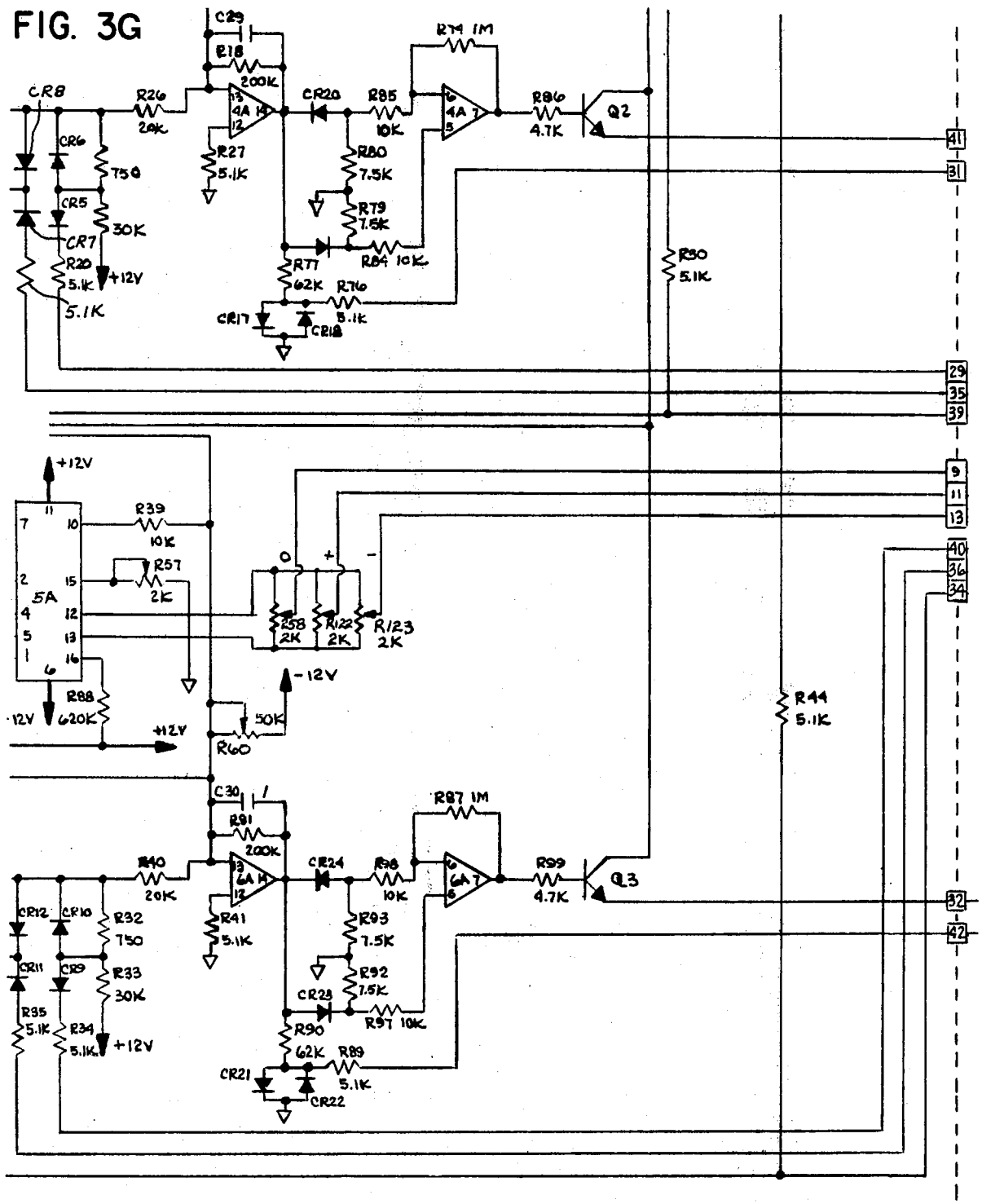

Each of slope amplifiers 58, 60 and 62 can have a positive output or a negative output by adjustment of suitable controls 58 on the lower front portion 14a of panel 14 (FIG. 2). For instance, for the red slope amplifier 58, a control 58a (FIG. 1b) provides a positive output and a control 58b controls a negative output. The green and blue slope amplifiers 60 and 62 have similar controls 60a, 60b, 62a and 62b, respectively. Each slope amplifier is designed so that the positive output can be gain controlled separately from the negative output; thus, the point at which a null occurs on the corresponding meter (any of the red, green and blue meters 16, 18 and 20) during setup produces zero output from the slope amplifier. Any deviation from this setup point in the time switch 44 produces a positive or negative output from this amplifier for which the gain can be controlled via upper or lower slope controls, such as slope controls 58a and 58b.

The outputs from the three slope amplifiers 58, 60 and 62 are directed by leads 58c, 60c and 62c to the inputs of meter driver summation amplifiers 38d, 40d and 42d (FIG. 1a). Also, fed into each of the slope amplifiers 58, 60 and 62 is a base line adjustment control to allow an operator to set into controller 10 any desired slope zero or base line.

The density channel offsets are produced by a lever switch 22 (FIGS. 1b and 2) with series resistors in 200 1 cc steps. The voltage from this switch divider network is fed into a summation amplifier 76 (FIG. 1b) for gain and into another amplifier 78 for inversion. Also fed into the inversion amplifier 78 is the probe offset 80, a current offset for probe use in a spot monitor application. The output of inversion amplifier 78 is carried by lead 82 to the three meter driver summation amplifiers 38d, 40d and 42d (FIG. 1a) corresponding to the red, green and blue colors. Each of the meter driver amplifiers 38d, 40d and 42d thus has three inputs, namely, the probe voltage (leads 38e, 40e and 42e) the time offsets (leads 58c, 60c and 62c) and density channel offsets (lead 82). The output of each meter driver amplifier is directed to two locations, first, to a meter limiter which limits the amount of current the corresponding meter receives to protect the meter and to produce 1 cc changes, and second, to a null detector amplifier to detect when the meter is nulled in order to turn off the null lamp for that color. For meter driver amplifier 38d, the limiter and null detector amplifiers are denoted by 38f and 38g, respectively (FIG. 1a). Similarly, driver amplifiers 40d and 42d have corresponding numbers for their limiters and detector amplifiers.

The time offset from switch 44 (FIG. 1b) is coupled by a lead 100 to a precision timer 102 (FIG. 1b) to produce zero to 99.9 second timing in 0.1 second steps. From the timer 102, the output is directed to the power input to the enlarger (not shown), such power input typically including two triacs which serve as switches 104 to control both sides of the AC line to the enlarger and to control up to a 5,000 watt enlarger bulb. The power supply preferably uses a high efficiency, small, lightweight power transformer so that controller 10 can be operated from 100 volts AC to 250 volts AC, 50–60 Hertz, with no changes in operation of the unit. The design of the power supply and control logic allows controller 10 to use only 20 watts or less of power from the AC line at 115 volts. Also, controller 10 has a focus switch 106 to allow the enlarger to be turned on to allow the set-up of controller 10 independent of the timing described above.

On housing 14, a switch 106 is spaced from expose bar 30. Null lamps 38h, 40h and 42h are provided near respective red, green and blue meters 16, 18 and 20 (FIG. 2). Lamps 38h, 40h and 42h will turn off when meters 16, 18 and 20 are at null condition. The null meters are used as indicators to show the position of light and color levels and are centered or at null conditions when the outputs of respective summing amplifiers 38d, 40d and 42d are zero.

The switch 106 is a three-position rocker switch used to control the enlarger. In the first or focus position, the enlarger is turned on and the meter illuminating lights and the nulling lamps 38h, 40h and 42h are actuated. In the second or center position of the switch, the timer is actuated and the expose bar 30 may be depressed. The meter lights and the nulling lamps are not on. The print or third position will actuate the timer and turn on the meter lights and the nulling lights, and the expose bar 30 may then be depressed.

The emulsion switches 38b, 40b and 42b on panel portion 14a are thumb wheel switches, two each for red, green and blue. These switches are used to set up the initial color balance and for making paper emulsion changes. A plus-minus switch is also provided for each color.

For adjusting slope, there are six potentiometers, three used for the over slope and three used for the under slope. These potentiometers are used for the initial setup and are mounted on lower front panel portion 14a as shown in FIG. 2.

As a pre-installation step, it is important that a setup of over normal and under negatives be printed and color balanced to match the analyzer or each other. Data printing data should be recorded for each. Data required includes the height of the enlarger, the f/stop, cyan, magenta and yellow settings and exposure times. The over negatives should be printed at approximately twice the normal printing time. The under negative should be printed at approximately half the normal printing time.

To install controller 10, the enlarger (not shown) associated with the controller is coupled to the power output of controller 10, namely the switches 104 (FIG. 1b). Then controller 10 is coupled to a convenient AC outlet. The on-off power switch 108 is turned to the on position and the on/off spot probe switch associated with density controller 75 (FIG. 1b) is set to the appropriate position (off for the video analyzer used and on for spot on-easel readings). The set density switch 22 (FIGS. 1b and 2) and density value input switches 24, 26 and 28 (FIG. 2) associated therewith are set typically to 65-30-30-30 or to the desired baseline numbers which are currently being used. The focus-print switch 106 is set to the focus position and at this time, the enlarger should be turned on. The focus print switch 106 is then switched to the center position thereof.

The set time switch 44 is set for 10.0 seconds. The expose bar 30 is depressed and the operator should check to see that the enlarger stays on for approximately 10 seconds. Time switch 44 is set to the same time as used to print the normal negative. Because of normal differences between timers, it is necessary to match timers. To do this, timer 44 is adjusted until its time-out matches the timer used to print the normal negative. This is accomplished by starting each timer at the same time and noting the time outs.

The next step is to set in the printing data for the normal negative, i.e., the f/stop, cyan, magenta and yellow, and the height of the enlarger as recorded in the above-mentioned pre-installation step. The negative should then be removed from the negative carrier of the enlarger if controller 10 is being used as a video analyzer translator. The empty carrier is placed back into the enlarger and the probe 32 is centered on the projected light pattern. If controller 10 is being used as a spot on-easel analyzer, then a probe target is placed on the probe and the probe is then centered over the appropriate area of the negative. Then the focus-print switch 106 is switched to the focus position.

The next step is to adjust the plus, minus, zero and the red, green and blue emulsion controls from wheels 38c, 40c and 42c on panel portion 14a (FIG. 2) until nulling lamps 38h, 40h and 42h are off and the null meters 16, 18 and 20 are centered. Then, the appropriate color and density readings from the video analyzer for the under negative are set into the thumb wheel switches relating to density, typically the readings being 35-30-30-30. If controller 10 is being used as a spot analyzer, the readings should be 65-30-30-30 in the color and density value input switches. Then, the next step is to set in the under negative printing times, f/stop, cyan, magenta, and yellow printing data as recorded in the above mentioned preinstallation step. With probe 32 under the light source and the enlarger turned on, the under slope red, green and blue potentiometer are adjusted until nulling lamps 38h, 40h and 42h are centered. Then the appropriate color and density readings from the video analyzer for the over negative are set in the color and density value input switches, namely about 95-30-30-30. If controller 10 is being used as a spot analyzer, the readings should be about 65-30-30-30 in the color and density value input switches. Then the next step is to set in the over negative printing times, f/stop, cyan, magenta, and yellow printing data as recorded in the above mentioned preinstallation step. With the probe 32 under the light source and the enlarger turned on, the over slope red, green and blue potentiometers are adjusted until the nulling lamps 38h, 40h and 42h and null meters 16, 18 and 20 are centered. At this time, photographic test prints should be made and processed.

Processed prints should be evaluated for match to original printed over normal and under prints. If changes are required, the following chart should be followed:

| IF THE PRINT PRODUCED IS: | CHANGE TO COLOR AND DENSITY VALUE SWITCHES: |
| --- | --- |
| too red | minus red numbers |
| too green | minus green numbers |
| too blue | minus blue numbers |
| too dark | minus density numbers |
| too cyan | plus red numbers |
| too magenta | plus green numbers |
| too yellow | plus blue numbers |
| too light | plus density numbers |

After any changes to the emulsion controls, a photographic test print should be made to verify results. The emulsion settings should be recorded and filed for reference. Production negatives can now be printed.

In production printing, a normal routine procedure should also be used to assure consistent results. Typically, the following procedure or one very similar should be used consistently:

1. Insert the video analyzer data into the color and density value input switches 22, 24, 26 and 28. If controller 10 is being used as a spot analyzer, then 65-30-30-30 should be used.

2. The negatives should now be cleaned and placed into the appropriate negative carrier of the enlarger.

3. The negatives should then be composed and focused.

4. Probe 32 should now be placed in the center of the light path of the enlarger or, if the controller 10 is being used as a spot analyzer, probe 32 should be placed on the appropriate area of the negative.

5. The f/spot should now be adjusted until the red nulling lamp 38h is out and the red null meter 16 is centered. If a null is not capable of being obtained, the timer switch 44 is adjusted up or down until a null is reached.

6. Adjust the magenta filters until the green nulling lamp 40h is out and the green null meter 18 is centered.

7. Adjust the yellow filters until the yellow nulling lamp 42h is out and the yellow null meter 20 is centered.

8. Replace the negative and turn off the enlarger.

9. Place photographic paper in the easel.

10. Depress expose bar 30 (FIG. 2).

11. At the end of the exposure, remove the paper and process it.

For daily quality control, a number of steps should be followed to ensure consistent results. Typically, these steps are as follows:

1. Each day, or at the beginning of each shift, the master negative should be printed and processed.

2. The print should be evaluated and suggested changes should be noted. Typical examples of print conditions and recommended changes to the color and density value switches of controller 10 are shown in the above chart. These changes are only for negative to positive use.

3. After an evaluation of a print has been made, changes to the color and density value switches may be made in accordance with the above chart.

4. Insert the corrections into the color and density value switches and re-null the controller 10 by adjusting the enlarger.

5. Reset the color and density value switches to the normal settings, i.e., 65-30-30-30. Nulling lamps 38h, 40h and 42h will be on and null meters 16, 18 and 20 will not be centered.

6. Reset the emulsion control until null has been reestablished.

7. Record the new emulsion control settings.

8. A photographic test should be run to ensure that proper adjustments have been made.

I claim:

1. Apparatus for controlling a photographic enlarger in accordance with a predetermined set of reference values for color and density with the enlarger having a light source capable of radiating light of different wavelengths comprising: means for sensing a number of different wavelengths of the light from said light source, said sensing means being operable to generate a voltage corresponding to the amount of light of each of said number of wavelengths, respectively; a timer; means coupled with the timer for applying a voltage to the enlarger for energizing the same during a period in which the timer is actuated; means coupled with the timer for adjustably setting the timer to any one of a number of different time periods; a summing device for each of said number of wavelengths, respectively, each device having a number of inputs and an output, each device being operable to provide a null condition at the output thereof when the sum of the input voltages is substantially zero, said sensing means corresponding to each of said number of wavelengths being coupled to one of the inputs of the respective device, said time setting means having means coupling it to another input of each device, respectively; means coupled with a third input of each device, respectively, for applying reference density and wavelength voltages thereto in accordance with said predetermined reference set; and means coupled with the output of each device, respectively, for indicating a null condition of the output thereof.

2. Apparatus as set forth in claim 1, wherein said sensing means comprises a probe having a number of photocells, each photocell being sensitive to a particular wavelength of light.

3. Apparatus as set forth in claim 2, wherein the output of the probe has adjustable means for varying the output voltages directed to said summing devices.

4. Apparatus as set forth claim 3, wherein the adjustable means includes a variable resistor for each of said number of wavelengths, respectively.

5. Apparatus as set forth in claim 1, wherein said voltage applying means includes switch means for coupling the timer to a power source to energize the enlarger.

6. Apparatus as set forth in claim 1, wherein the means for coupling the time setting means to the input of each device, respectively, includes a slope amplifier for each of said number of wavelengths of light, respectively, each slope amplifier being independent of the other slope amplifiers.

7. Apparatus as set forth in claim 6, wherein the slope amplifiers are provided with independent over and under slope adjustment devices.

8. Apparatus as set forth in claim 1, wherein each summing device includes a summing amplifier.

9. Apparatus as set forth in claim 1, wherein said null indicating means includes a meter and a lamp for each device, respectively.

10. Apparatus as set forth in claim 1, wherein said sensing means includes a probe with a number of photocells, and filter means for filtering the light directed toward the photocells so that each photocell receives light of a specific wavelength.

* * * * *